March 19, 1963         J. KRAMER         3,082,094
              METHOD FOR PREPARING FISH
Filed Jan. 18, 1960                3 Sheets-Sheet 1
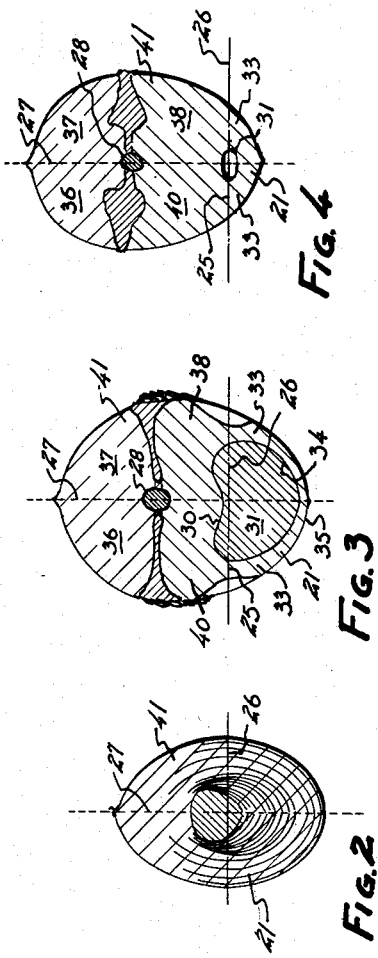
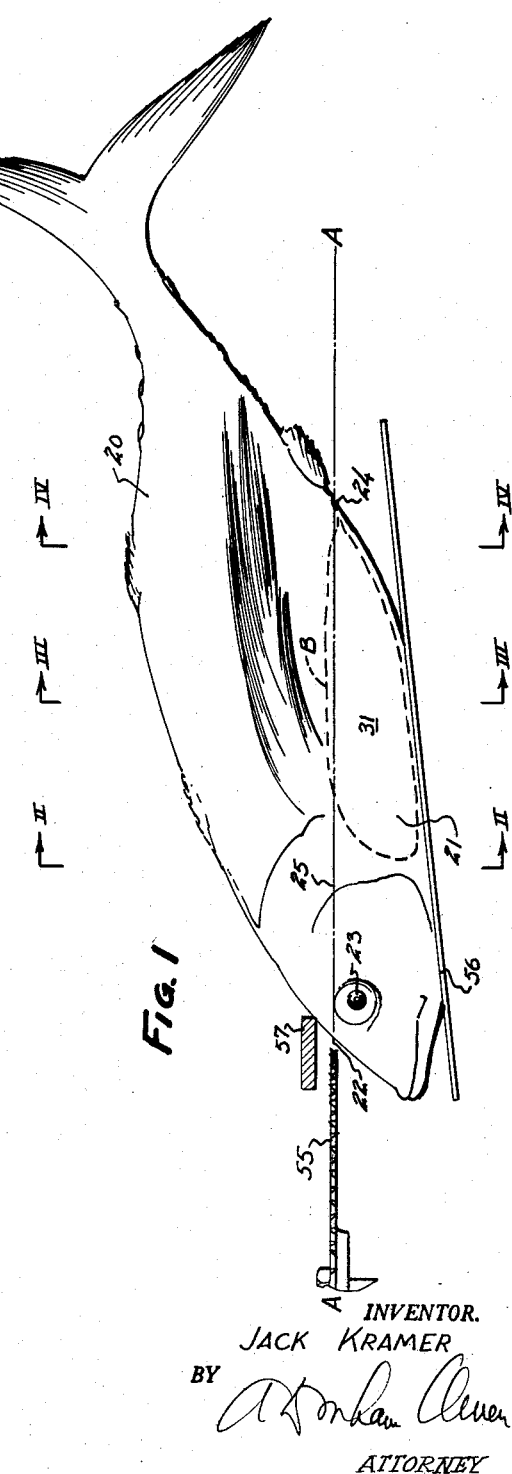
INVENTOR.
JACK KRAMER
BY
ATTORNEY March 19, 1963 J. KRAMER 3,082,094
METHOD FOR PREPARING FISH
Filed Jan. 18, 1960 3 Sheets-Sheet 2
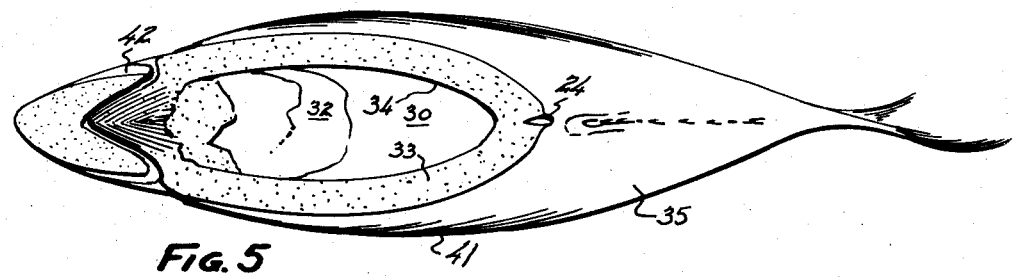
FIG. 5
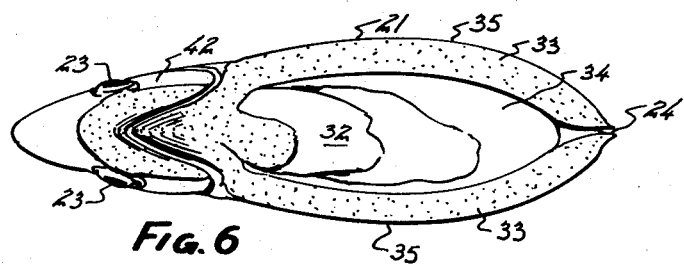
FIG. 6
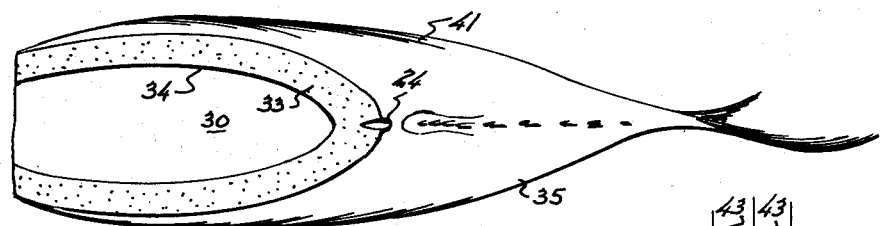
FIG. 8
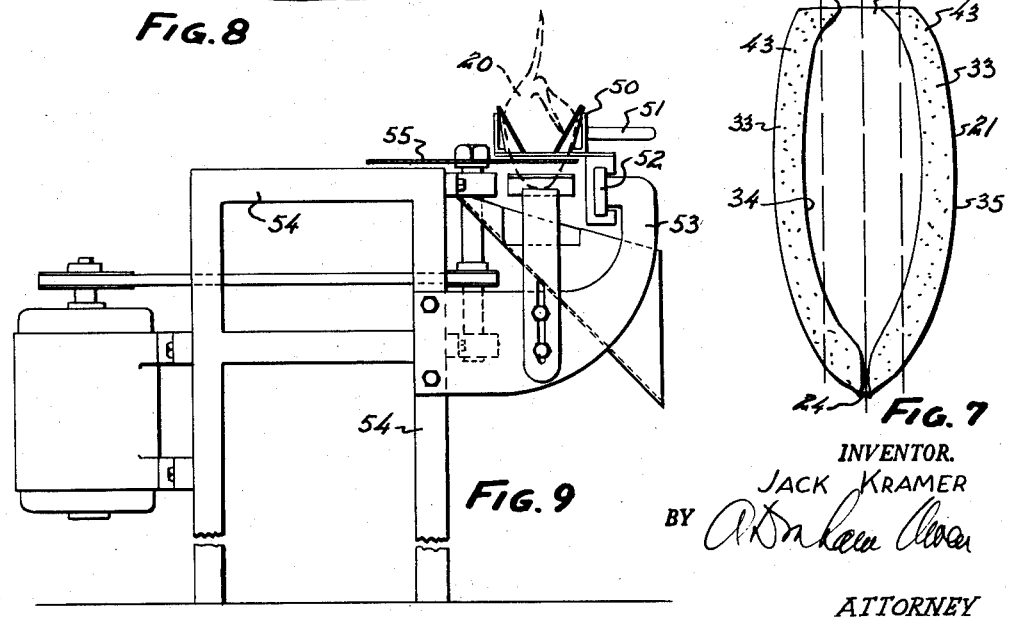
FIG. 9
FIG. 7
INVENTOR.
JACK KRAMER
BY
ATTORNEY

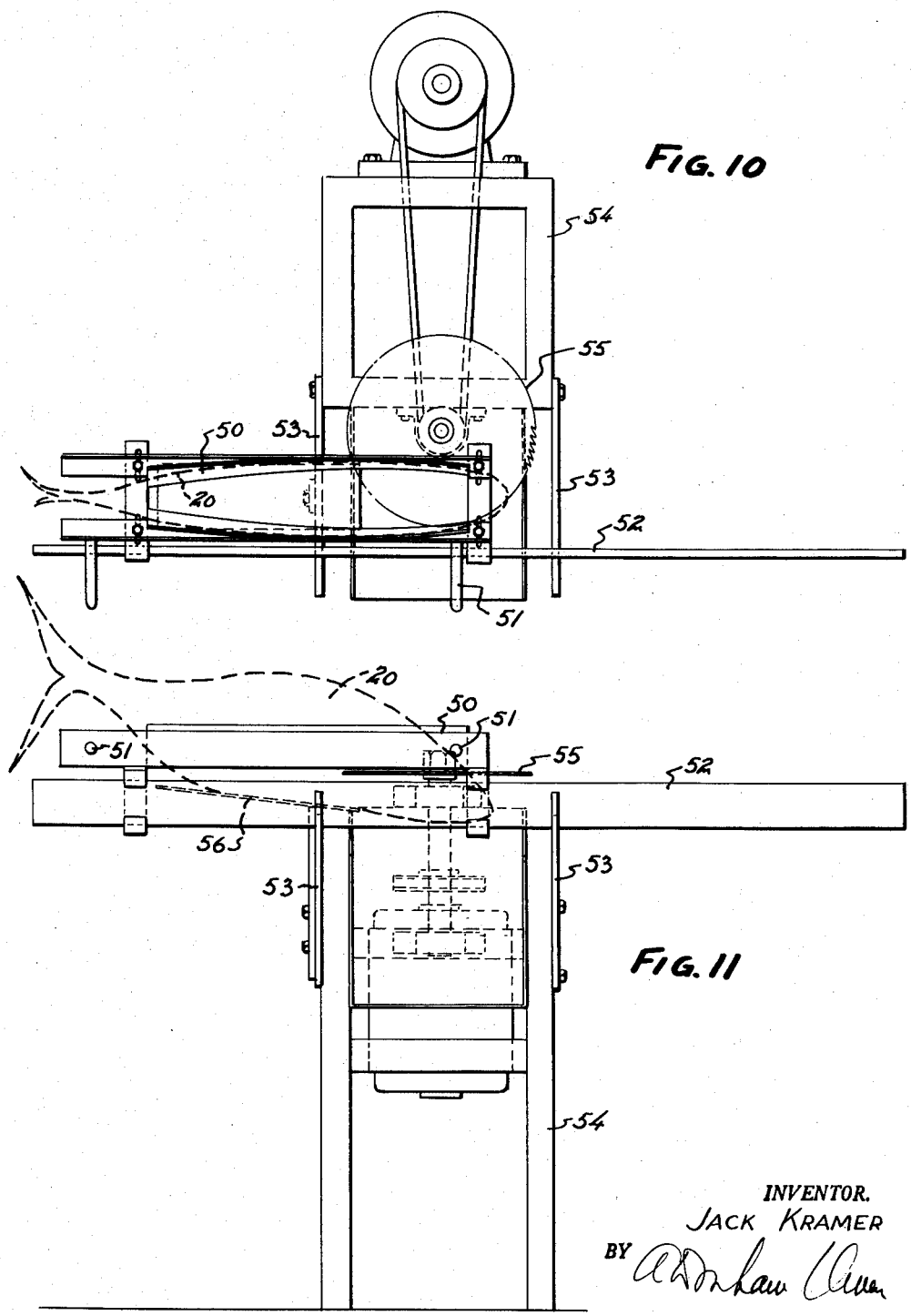

United States Patent Office 3,082,094
Patented Mar. 19, 1963

3,082,094
METHOD FOR PREPARING FISH
Jack Kramer, Lomita, Calif., assignor to Van Camp Sea Food Company, Long Beach, Calif., a corporation of California
Filed Jan. 18, 1960, Ser. No. 3,174
2 Claims. (Cl. 99—111)

This invention relates to improvements in fish processing and, particularly, to a novel way of preparing tuna and similar fish for recovery of the edible meat and later cooking and canning.

Heretofore, such fish have first been eviscerated by a longitudinal cut in the side of the belly wall through which the viscera is removed after severing its connection near the head end of the fish. This leaves the belly walls still connected to the upper body portion of the fish.

Among the objects of my invention are: more efficient evisceration without making a special cut for that purpose, recovery of the belly wall meat in a form in which it can be used for more valuable products, significant labor savings, better handling of the loins, less exposure of meat to oxidation before cooking, and a better separation of the fish.

Other objects and advantages will appear from the following description.

I have discovered that tuna and tuna-like fish can be divided by a preparatory cut into a main loin section containing about 75 to 80 percent of the fish and into a lower head and belly section containing the balance of the fish.

My improved process employs a single horizontal cut along the lower body of the fish beginning at the head above or through or below the eyes and ending in the area of the vent. This cut is made so as to pass just below the roof of the stomach so that the bulk of the viscera are retained in the belly section and the main loin section is easily cleaned.

Whether the cut begins above, through or below the eyes will depend upon the species and the size of the fish being processed. In general, the larger the fish the smaller the stomach cavity in relation to the loin section, therefore, the smaller the fish, the higher on the head will the cut begin so as to pass along just below the roof of the stomach and come out near or at the vent.

Many advantages flow from my new method, some of which will now be enumerated:

(1) The belly meat which comes off with the lower head and belly section is contained in the thin wall between the internal belly lining and the outer skin. This meat is valuable for many products, and being high in natural oil content, it is considered choice. By methods heretofore used, this portion of the fish was reduced to a less valuable form because it was cooked along with the thicker loins and hence was overcooked. Also it became bruised and flaked off in handling the fish.

(2) The belly meat is also valuable for canning in the raw state. Preferably it is cut into pieces about the size of sardines. This use of the belly meat is particularly advantageous where labor costs are low.

(3) The uncooked belly meat is also valuable as the basic ingredient of a delicacy known as "Ventresca," and my new method provides a supply for this purpose.

(4) Where shipping of whole frozen fish is involved, my invention removes the inedible portion of the head along with the belly portion in such a way that the main loin portion is the only part that needs to be shipped and local use is made of the belly portion.

(5) Even if the belly wall of the fish is to be used in the same manner as the other edible portions, my method enables the cooked belly wall flesh to be recovered in better condition and more economically since it can be cooked separately from the balance of the fish. Because the belly wall portion is thin, it should be cooked for a shorter time than the thicker loin portions of the fish. Being handled separately, the belly wall portions are not crushed or distorted as they are when they remain on the fish in the prior art procedures.

(6) A higher percentage of cannable fish meat is obtained.

(7) Cleaning of the loins is made easier.

(8) Less labor is needed to clean the fish.

(9) After the cut is made by my method, the only parts of the meat exposed are the narrow edges of the side wall, leaving the main loin section intact in its skin and protected during handling and shipment.

(10) Summarizing, my invention removes the belly flesh for use in a raw state so that it can be processed to get products of greater value and so that it is away from the main loin portions of the fish when the latter is processed, thereby eliminating the time heretofore spent in cleaning up the attached belly portions, and gaining other of the advantages outlined above.

My process is illustrated in the drawings in which
FIG. 1 is a diagrammatic view showing in vertical elevation the profile of a fish held in position for cutting by a knife, saw blade or other cutting means held in a plane A—A normal to a plane passing vertically through the backbone and in a plane generally parallel with the upper lining B of the stomach;

FIGS. 2, 3 and 4 are diagrammatic cross-sectional views taken on the lines II—II; III—III; and IV—IV respectively of FIG. 1;

FIG. 5 is a view in plan with the fish turned with the cut bottom facing upwardly, showing the relatively thin walls where the belly section was severed;

FIG. 6 is a like view of the belly section of the same fish showing it at the instant of severance and before the viscera and head portions are removed;

FIG. 7 is a plan view of the belly section of FIG. 6 with the head portion and viscera removed; and with dotted lines indicating longitudinal cuts sometimes made preparatory to placing the meat in the cans raw;

FIG. 8 is a plan view of the main loin section of FIG. 5 with the viscera removed and the main section ready for further processing, which may be freezing for ship ment or immediate cooking;

FIG. 9 is a diagrammatic view in end elevation of piece of apparatus adapted to support the fish as it i cut, in this case by a rotary saw blade set to rotate in horizontal plane;

FIG. 10 is a diagrammatic view in plan of the devic of FIG. 9; and

FIG. 11 is a diagrammatic view in side elevation o the device of FIG. 9.

In FIGS. 9, 10 and 11, the fish is shown in dotted line:
Since my method may be practiced in any number c different forms of apparatus, the apparatus illustrated i FIGS. 9, 10 and 11 is not to be taken as limiting th invention. While on the subject of apparatus, it is cor templated (a) that the carriage to support the fish whil the cut is made can be on an endless conveyor; (b) th; there can be a lower conveyor, preferably a rotary tabl type, synchronized to receive the belly section of the fis as it is cut free of the upper main loin section; (c) th; each cut section of the fish will then be conveyed to st; tions where evisceration and cleaning will be completec and (d) that at subsequent stations other operations o the fish parts can be carried on.

In its preferred form, my method contemplates sup porting the fish in a longitudinal upright position abou as shown in FIG. 1, with the head end lower than the ta end in relation to the plane of the cutting means by wha ever sloping is necessary to make the cut pass in the general vicinity of plane A—A into the head and along the lower body where it exits at or near the vent, thereby dividing the fish into a lower belly portion containing the bulk of the viscera and an upper main body portion containing the loins and backbone.

Preferably, the cut proceeds along the plane A—A, severing the lower body of the fish by a horizontal cut passing just under the roof B of the stomach.

Where the cut is begun on the head of the fish will depend on the species and the size of the fish. With skipjack (one of the tuna species) the entrail or viscera section of the fish is higher and so the cut is begun near or above the eyes; whereas with albacore of good size, the height of the stomach is less and so the cut is begun lower down on the head. A preferred consideration in my invention is to make the cut just below the roof of the stomach so the lining will remain intact covering the loins above. This lining, together with the skin, provides a protection to the loin meat as this main section of the fish goes through the subsequent steps, which may involve freezing, transporting and cooking.

Where the cut is ended is preferably fixed by the vent— the aim being to end the cut at or near the vent. This leaves both portions of the stomach open—the one on the lower or belly section and the one on the upper or loin section, so that by machine, by brush, or by hand, the viscera and head portions may be completely removed.

While I have described the cut as proceeding from head to vent, it can be reversed, if desired.

The preferred manner of practicing the invention where a number of fish of the same general size and age are being processed is to put through one of the fish as a sample. The rack and cutting means are then adjusted relative to each other to where the cut on the plane A—A will pass along just under the roof of the stomach.

Referring to FIG. 1, I show in profile the outline of a tuna fish 20, which may be a skipjack, albacore, or any other tuna-like fish adapted to have its belly section 21 severed in the manner herein described. With skipjack in the seven to eight pound range, I find the cut can start at 22 above the eyes 23 and proceed along to the vent 24. This cut 25, shown in dotted lines, is made by any suitable instrument which cuts in a plane 26 normal to the plane 27 of the backbone 28 of the fish.

As shown in the cross section taken at II—II on FIG. 1, the cut 25 is cutting through the gills and other matter filling the head.

At the cross section III—III of FIG. 3, the cut 25 in the plane 26 is just below the ceiling 30 of the stomach 31, the latter containing the viscera 32. The cut 25 severs the belly walls 33 which are lined on the inside with the stomach lining 34 and on the outside with the skin 35 of the fish.

At the cross section IV—IV of FIG. 4, the cut 25 is about to pass out of the fish at the end of the stomach cavity 31. The main loin sections 36, 37, 38 and 40 lie above the cut 25 and form the main upper section 41.

In FIGS. 5 and 6 are shown diagrammatically the severed sections left by the cut 25 with the belly section 21 lying cut-side up and with the main loin section 41 lying cut-side up. In both cases, the viscera 32 and head portions 42 remain. In FIGS. 7 and 8, the sections are shown with the viscera 32 removed. The belly section 21 is now ready for processing, which may take one of several forms. In areas of the world with low purchasing power, a satisfactory product is made by cutting the belly meat into strips 43 and placing the strips while raw in a can, partially cooking it in the usual exhaust box, draining off the liquid, adding tomato sauce, sealing the can, and cooking in a retort. For areas where the delicacy known as "Ventresca" is bought, the belly meat 33, rich in natural oils, is processed to give that product. One of the advantages of my process is that it gives such flexibility in the use to be made of the belly meat.

Under earlier methods, the belly has ended up in the cheapest product, namely, the grated form, because of its being overcooked and because it is subjected to unavoidable bruising and flaking as the whole fish is handled. One of the problems of the tuna industry today is the oversupply of the grated form of tuna. By my new method, the belly meat is cooked separately for the length of time needed for its wall thickness, and, as suggested above, qualifies for a more expensive pack. In other words, an important advantage of my method is that it permits use of the belly meat in products where it is most valuable.

The main body portion 41 comprising the valuable loins 36, 37, 38 and 40 can by my process be handled to greater advantage and with less expense. It has already been explained how the belly section 21 is made more valuable by my process. The main body portion, freed of the belly portion and the viscera, can now be frozen and shipped with a saving in space and weight. The percentage of weight removed with the belly sections runs between 20 and 25 percent. This leaves 75 to 80 percent in the main loin section 41, all of which is usable in high priced products.

In FIGS. 9, 10 and 11 are shown diagrammatically a form of apparatus for making the cut 25. This comprises a frame 50 with a handle 51. The frame 50 is slidably mounted on the main rail 52 supported by the goosenecks 53 on the frame 54. The cut 25 is made by passing the fish 20 through the saw blade 55, mounted to rotate in a generally horizontal plane. Under the traveling frame 50 is a guide plate 56, vertically adjustable, to bring the head of the fish to the saw blade at the correct entry point 22. A crossbar 57 on the frame 50 holds the head of the fish on the upper side.

As noted before, any suitable apparatus or frame may be used to pass the fish 20 through the saw means.

It will thus be seen from the foregoing description that my new method of preparing fish for processing attains many advantages and has the great advantage of simplicity in itself.

What I desire to claim is:

1. A method of preparing uneviscerated uncooked tuna fish for further processing, comprising cutting the fish in two longitudinally with a horizontal cut extending from the head along a plane normal to the vertical plane through the backbone and passing approximately through the vent and just below the roof of the stomach so that the stomach lining at the roof will remain intact covering the loins above, thereby dividing the belly meat and viscera from the loin meat.

2. The method of claim 1 wherein the cutting is done by sawing.

References Cited in the file of this patent

UNITED STATES PATENTS

| | | |
|---|---|---|
| 2,041,986 | Wetmore | May 26, 1936 |
| 2,088,831 | Ash et al. | Aug. 3, 1937 |
| 2,411,188 | Borg | Nov. 19, 1946 |
| 2,423,174 | Brown | July 1, 1947 |
| 2,479,010 | Jones | Aug. 16, 1949 |